Figure 1:
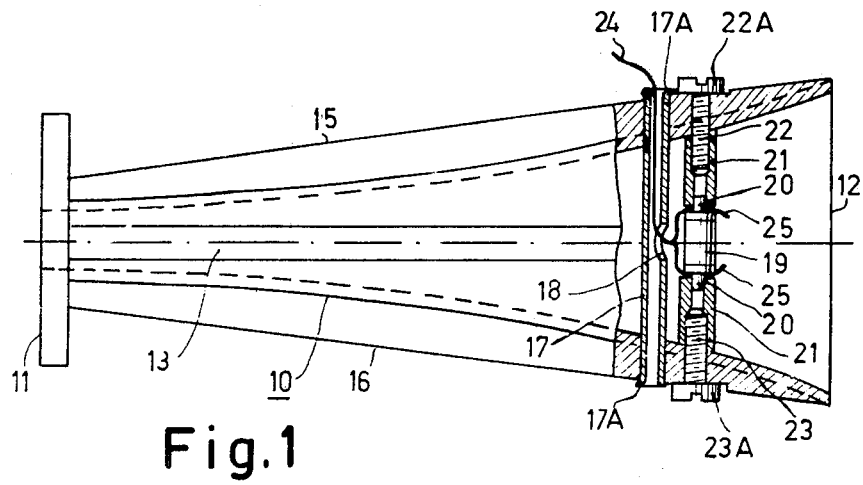

United States Patent [19]
Guennou

[11] B 3,990,081
[45] Nov. 2, 1976

[54] DOPPLER RADAR DEVICE
[75] Inventor: Serge Guennou, Croissy-sur-Seine, France
[73] Assignee: U.S. Philips Corporation, New York, N.Y.
[22] Filed: Feb. 7, 1975
[21] Appl. No.: 547,994
[44] Published under the second Trial Voluntary Protest Program on January 20, 1976 as document No. B 547,994.

[30] Foreign Application Priority Data
Feb. 11, 1974 France .............................. 74.4466

[52] U.S. Cl. .................................. 343/786; 343/8; 343/701
[51] Int. Cl.² ........................................ H01Q 13/02
[58] Field of Search ............. 343/8, 9, 10, 701, 702, 343/786

[56] References Cited
UNITED STATES PATENTS
3,806,942  4/1974  Preti .................................. 343/702
3,852,743  12/1974  Gupta ................................... 343/8

Primary Examiner—Eli Lieberman
Attorney, Agent, or Firm—Frank R. Trifari; George B. Berka

[57] ABSTRACT

A Doppler radar device in which a detector diode is arranged in a flared horn which constitutes the aerial of the device. A metal sleeve is arranged in the flared horn perpendicular to the axis and parallel to the smaller sides of the horn, the said body being arranged behind the detector diode (viewed from the radiating side of the horn), and parallel to the diode.

4 Claims, 3 Drawing Figures

DOPPLER RADAR DEVICE

The invention relates to a Doppler radar device which transmits a linearly polarized electromagnetic wave which is radiated by means of an aerial which is formed by a flared horn having a rectangular cross-section, the smaller sides thereof being parallel to the direction of the electrical field of the radiated wave, and which detects the Doppler-frequency signal resulting from the reception of the wave reflected by a moving object by means of a semiconductor diode which is arranged in the said horn.

It is generally known to arrange the diode which detects the Doppler-frequency signal in the horn which constitutes the aerial of small Doppler radar devices. Notably known is a radar device for the frequency range of from 1 to 9.5 GHz which is marketed by Worl-Alarm and which operates at a frequency 9.35 GHz or 9.47 GHz, the detector diode therein being arranged in the immediate vicinity of and parallel to one of the large inclined faces of the horn and being situated in the vicinity of the opening in the central plane of the said horn. A plurality of signals of different amplitude are applied to such a diode. Firstly, a signal is applied which has an amplitude which is comparatively high and which is a part of the wave to be transmitted and to be radiated by the horn, referred to hereinafter as the "local signal". Secondly, there are applied a plurality of signals which have an amplitude which is generally much lower and which correspond to the waves reflected by stationary objects, the frequency of the latter signals being equal to that of the said local signal. Thirdly, there are applied one or more signals which have an amplitude which is generally low and which correspond to waves which are reflected by one or more objects which move in a direction comprising a component which coincides with the direction of the beam transmitted by the radar device.

The waves reflected by stationary objects give rise to stationary waves which are more or less noticeable, whilst the signals corresponding to waves reflected by moving objects (and having a frequency which, because of the Doppler-Fizean effect, differs from the frequency of the waves radiated by the aerial of the radar device) produce Doppler-frequency signals after demodulation.

A problem occurring in the receive section of such radar devices is caused by the excessively high amplitude of the local signal applied to the detector diode.

In order to realize optimum detection of the Doppler signals, the amplitude of the local signal should be of a given value, this amplitude amounting to, for example, 0.4 – 0.7 volts, when the detector diode is a Schottky diode, in order to polarize this diode beyond the kinked section of its static characteristic, but it is not desirable for the voltage of the local signal applied to the diode to be substantially higher, because the detection of the Doppler signal is then accompanied by noise which increases as the polarization voltage increases. Furthermore, an unnecessary high voltage of the local signal gives rise to premature "aging" of Schottky diodes operating in these conditions.

In order to prevent the detector diode from being subjected to an excessively high voltage of the local signal, in the said Worl-Alarm radar device the detector is arranged at an angle with respect to the lines of force of the electrical field of the radiated wave. However, this arrangement has the drawback that the amplitude of the voltage applied to the diode by the electrical field of the reflected waves is reduced at the same ratio.

The invention has for its object to mitigate the said drawbacks and to limit the amplitude of the local signal applied to the detector diode in a very simple manner, without the amplitude of the incident signal, corresponding to the received reflected wave, being reduced.

The Doppler radar device according to the invention is characterized in that a conductive body is arranged inside the horn and parallel to the direction of the electrical field of the transmitted wave, the width of the said body being small with respect to the width of the horn and the body occupying the entire "height" of the horn at the area where the body is arranged, the said body being situated in the horn at a distance from the horn opening which is larger than the distance between the semiconductor diode and the said opening, the said semiconductor diode being arranged parallel to the direction of the electromagnetic field and in a region where the intensity of the electrical field of the radiated wave is attenuated by the presence of the said conductive body.

The invention utilizes the fact that the wave which causes the local signal and the received reflected waves propagate in opposite directions.

It is generally advantageous to arrange the said conductive body in the central plane of the flared horn because the wave radiated by the horn and the detection field of the radar device then remain symmetrical; however, such an arrangement is facultative.

If the conductive body is arranged in the central plane of the flared horn and if in this central plane also the semiconductor diode which acts as the detector diode is arranged in front of the conductive body (viewed from the opening of the flared horn), maximum attenuation of the load signal which is applied to the detector diode is achieved, because the detector diode is then completely situated in the "shade" of the said conductive body. It is thus possible to increase the energy of the radiated wave without endangering the detector diode. On the other hand, the wave reflected by an object is not attenuated by the presence of the conductive body because to the reflected wave this body is situated behind the detector diode.

In the case of a Doppler radar device utilizing a low-power oscillator, it may be advantageous to arrange the said conductive body in the central plane of the flared horn and to arrange the detector diode in a shifted position with respect to the said central plane in order to obtain a given value of the local signal applied to the detector diode, the said given value being sufficient to polarize the detector diode. The proper exciation of the detector diode by the signals reflected by objects is then maintained.

It is also advantageous to use a metal sleeve as the conductive body. This hollow metal sleeve can be used for substantially screening the connection wires of the detector diode, thus preventing comparatively high parasitic voltages from being induced in these wires by the magnetic field of the wave radiated by the horn.

By taking the steps according to the invention, a compact, small Doppler radar device can be very ecomonically realized, because the correct value of the local signal can then be applied to the detector diode, so that optimum detection of the Doppler signal is realized without use being made of a circulator which has a high cost price and a volume and weight which are not negligibly small.

The invention will be described in greater detail hereinafter with reference to a preferred embodiment as shown in the drawing.

Figure 2:
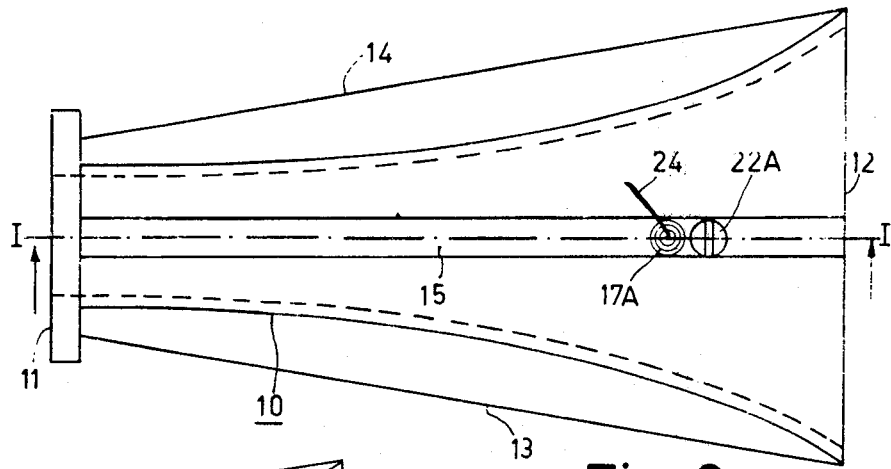
Figure 3:
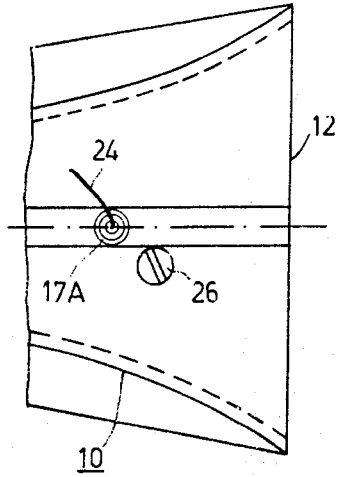

FIG. 1 is a side elevation, partly in a sectional view taken according to the line I—I of FIG. 2, of a horn of a Doppler radar device according to the invention, FIG. 2 is a bottom view of the horn shown in FIG. 1, and FIG. 3 is a plan view of the end of a different horn of a Doppler radar device according to the invention which is situated on the opening side.

FIGS. 1 and 2 show a horn 10 of a known type; this flared horn 10 has an internal rectangular cross-section and an exponentially varying profile; however, the invention is not restricted to the use of such a type of horn.

On its end which is shown at the left in the figures, the horn 10 is provided with a flange 11 for mounting the horn on a generator which radiates a linearly polarized electromagnetic wave, the said generator applying a $TE_{10}$ wave to the input of the horn which is vertically polarized and which propagates in the direction of the opening 12 of the horn 10 which is shown at the right in the figures.

In the present embodiment the smaller sides (vertical sides) of the horn 10 are reinforced by external ribs 13 and 14 which are situated in the middle of the said sides; the larger sides (horizontal sides) of the horn 10 are reinforced by external ribs 15 and 16 which are also situated in the middle of these sides.

A conductive body in the form of a hollow metal sleeve 17, formed by a gold-plated piece of cupper tube, is vertically arranged in the central plane of the horn 10 and is situated in two holes provided in the larger sides of the horn 10 and the reinforcement ribs 15 and 16.

In its centre the said sleeve 17 is provided with an opening 18 which is directed towards the opening 12 of the horn 10. The sleeve is held in place by two small broadened portions 17A, at least one of which is made after the sleeve 17 has been fitted in the walls of the horn.

A detector diode 19, comprising an insulating cylindrical body which is terminated on both ends by metal contacts 20, each of the said contacts being provided with an axial projection, is vertically arranged on the right of the metal sleeve 17. The diode 19 is held in place by two insulating, tubular intermediate pieces 21 which are provided with borings in which the said axial projections engage. The said intermediate pieces 21 are held in place on the one side by an insulating bolt 22 which passes through a hole in the rib 15, and on the other side by an insulating bolt 23 which passes through a hole in the rib 16. The said bolts are screwed into a threadened portion of the boring in each of the tubular intermediate pieces 21. The intermediate pieces 21 and the bolts 22 and 23 are preferably made of a material belonging to the group of polyamides, for example, the material which is commercially available under the name "NYLON".

A silicon Schottky diode can be used as the detector diode, for example, one of the types BAW 95, 1 N 23, 1 N 415. The connection of the diode 19 to the detection circuit is realized by an insulated, shielded wire 24 having two conductors which pass, for example, through the upper portion of the sleeve 17 and subsequently through the opening 18. The said conductors are welded to two triangular, concave elastic metal washers 25 which are known as "DELTA washers". The said washers are provided about the relevant projections of the contacts 20 of the diode 19 and are partly pressed in under the influence of the pressure exerted between the diode 19 and the intermediate pieces 21 because the intermediate pieces 21 are mounted under pressure.

In the embodiment shown in the FIGS. 1 and 2, the metal sleeve 17 and the detector diode 19 are situated in the central plane of the flared horn 10.

In the embodiment shown in FIG. 3, the metal sleeve 17 is also arranged in the central plane of the horn 10, but the detector diode which is situated in the prolongation of the bolt 26 has been shifted with respect to the said central plane; however, the distance between the diode and the opening 12 remains smaller than the distance between the opening 12 and the sleeve 17. It is also to be noted that a bar, a pin and the like can alternatively be used for the conductive body.

What is claimed is:

1. A Doppler radar device which transmits a linearly polarized electromagnetic wave which is radiated by means of an aerial which is formed by a flared horn having a rectangular cross-section, the smaller sides thereof being parallel to the direction of the electrical field of the radiated wave, and which detects the Doppler-frequency signal resulting from the reception of the wave reflected by a moving object by means of a semiconductor diode which is arranged in the said horn, characterized in that a conductive body is arranged inside the horn and parallel to the direction of the electrical field of the transmitted wave, the width of the said body being small with respect to the width of the horn and the body occupying the entire "height" of the horn at the area where the body is arranged, the said body being situated in the horn at a distance from the horn opening which is larger than the distance between the semiconductor diode and the said opening, the said semiconductor diode being arranged parallel to the direction of the electromagnetic field and in a region where thte intensity of the electrical field of the radiated wave is attenuated by the presence of the said conductive body.

2. A radar device as claimed in claim 1, characterized in that the conductive body is arranged in the central plane of the flared horn.

3. A radar device as claimed in claim 1, characterized in that the semiconductor body diode is arranged in the central plane of the flared horn, and is situated in front of the conductive body, viewed from the opening of the flared horn.

4. A radar device as claimed in claim 1, characterized in that the conductive body is a metal sleeve, the connection wires of the semiconductor diode being partly situated inside the said sleeve.

* * * * *